UNITED STATES PATENT OFFICE.

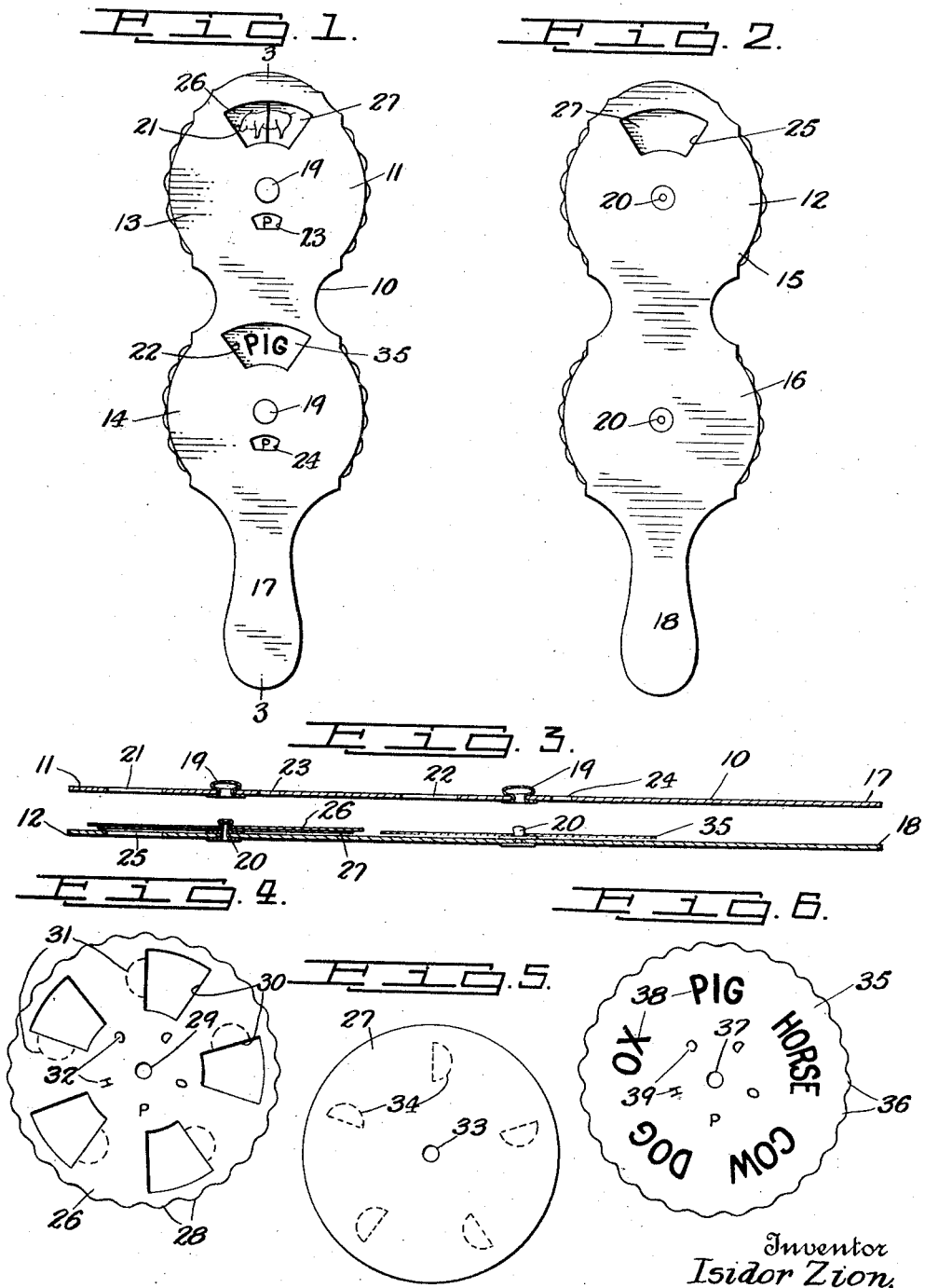

ISIDOR ZION, OF RIDGEFIELD, NEW JERSEY.

EDUCATIONAL DEVICE.

1,346,930.   Specification of Letters Patent.   Patented July 20, 1920.

Application filed December 29, 1919. Serial No. 347,889.

*To all whom it may concern:*

Be it known that I, ISIDOR ZION, a citizen of the United States, and residing at Ridgefield, in the county of Bergen and State of New Jersey, have invented certain new and useful Improvements in Educational Devices, of which the following is a specification, such as will enable those skilled in the art to which it appertains to make and use the same.

This invention relates to educational devices designed for use particularly by children, and the object of the invention is to provide a device of the class specified which may be used for illustrating pictures, signs, characters, numerals and the like and for giving the names or answers to such pictures, signs and the like; a further object being to provide means whereby the separate subjects of the device may be keyed so that the proper answer to a given question, or the proper title of a given picture may be found upon the manipulation of the device; a still further object being to provide means whereby the pictures, signs, characters, numerals and the like may be divided into separate parts and said parts brought together; and with these and other objects in view the invention consists in a device of the class specified which is simple in construction and operation and practical in use.

The invention described and claimed herein is an improvement on that described and claimed in a prior application filed by me May 26, 1919, Ser. No. 299,913, and is fully disclosed in the following specification, of which the accompanying drawing forms a part, in which the separate parts of my improvement are designated by suitable reference characters in each of the views, and in which:—

Figure 1 is a plan view of one side of my improved educational device;

Fig. 2 a plan view of the opposite side of the device;

Fig. 3 a central longitudinal section through the device on the line 3—3 of Fig. 1 with the separate parts thereof detached; and, Figs. 4, 5 and 6 are detail plan views of one set of disks or dials which I employ.

In Figs. 1 to 3 inclusive, I have shown one of my improved educational devices 10, said device consisting of front and back parts 11 and 12. Each of these parts is of the same form, or of the same outline as clearly indicated in Figs. 1 and 2. The part 11 is provided with two approximately circular portions 13 and 14, while the part 12 is provided with similar portions 15 and 16, and the circular portions 14 and 16 of said parts are each provided with handle members 17 and 18 respectively.

Secured centrally of the circular portions 13—14 of the part 11 are socket members 19 of ball and socket fastening devices, and the ball members 20 are secured centrally of the circular portions 15 and 16 of the part 12.

The circular portions 13 and 14 of the part 11 are each provided with large apertures 21 and 22 and with small apertures 23 and 24, and the circular portion 15 of the part 12 is provided with a large aperture 25, this construction being clearly shown in Figs. 1 and 2.

I also employ a pair of question data disks 26 and 27, said pair of disks being shown in Figs. 4 and 5 of the drawing. The disk 26 is larger than the disk 27 and the periphery thereof is provided with a plurality of projections 28. An aperture 29 is formed centrally of the disk 26 through which aperture the ball member of the circular portion 15 is adapted to pass. The disk 26 is provided with a plurality of spaced apertures 30, at one side of which the face of the disk is provided with pictures, characters and the like, or parts thereof, and for the purpose of illustration I have represented the same by half circles shown in dotted lines at 31. The disk 26 is also provided with a plurality of letters or designating or key characters 32 which coöperate with the apertures 30 and representations of pictures and the like 31, as hereinafter described.

The disk 27 is provided with a central aperture 33 through which the ball member 20 of the circular portion 15 also passes and the face of said disk is provided at spaced intervals with partial representations of characters, figures and the like, indicated in dotted lines at 34, and these representations are adapted to register with the representations 31 on the disk 26 and are observed through the apertures 30 of said disk. In Fig. 1 I have illustrated in the aperture 21 the representation of a pig, one-half of the pig being drawn, printed or otherwise formed on the disk or dial 26, while the other half is on the disk or dial 27.

In Fig. 6 of the drawing I have shown an answer disk or dial 35, the periphery of which is provided with a plurality of projecting members 36 and at the center of the disk is an aperture 37 through which the ball member 20 of the circular portion 16 is adapted to pass. The face of the disk 35 is also provided at spaced intervals with answers or titles 38 to the characters, figures and the like shown on the disks 26 and 27, and these answers or titles in the construction shown are "Pig," "Horse," "Cow," "Dog" and "Ox." The disk 35 is also provided with designating or key letters or characters 39 which coöperate with the answers or titles 38 in the manner hereinafter set out.

In the use of the device the separate parts 11 and 12 are separated in the manner shown in Fig. 3 and a disk or dial 27 similar to that shown in Fig. 5 is first placed upon the ball member 20 of the circular portion 15, after which a disk or dial 26 similar to that shown in Fig. 4 is placed over the disk or dial 27, and a disk or dial 35 similar to that shown in Fig. 6 is placed over the ball member 20 of the circular portion 16 in the manner illustrated in Fig. 3, and the part 11 is then secured to the part 12 by snapping the socket members 19 on the ball members 20. The device is now ready for use and the disk or dial 26 is first manipulated to bring a part of the representation of a figure, character and the like in the aperture 21, after which the disk or dial 27 is manipulated by a finger passed through the aperture 25 on the part 15 to bring the other half of the first named representation in proper position as is illustrated in Fig. 1, and in order to find the proper answer or title to the illustration shown in the aperture 21, the disk or dial 35 is manipulated until the designating or key letter corresponding to that shown in the aperture 23 appears in the aperture 24, and when this operation is completed, the title or answer will appear in the aperture 22.

It will be apparent that the projecting members 28 and 36 on the disks or dials 26 and 35 respectively protrude beyond the periphery of the circular portions 13 to 16 inclusive, or at the opposite sides thereof in the manner shown in Figs. 1 and 2, and permit of the manipulation of said disks or dials by the fingers of the operator, while the disk or dial 27 is manipulated through the aperture 25.

The distinctive features of this invention over that shown in my prior application are in the specific means of connecting or detachably connecting the separate parts 11 and 12 of the device, and to form on the means for accomplishing this result a pivot or axis for the disks or dials employed, and also in the form of and use of the disks or dials 26 and 27 with the apertures or cut out portions 30 in the disks 26, and while I have illustrated one use of the device and have shown the disks or dials with certain data thereon, and on but one side thereof, it will be apparent that my invention is not limited to these details, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. An educational device of the class described comprising a holder composed of two approximately similar parts, attaching devices secured to each of said parts for detachably connecting the separate parts of the device, disks or dials rotatably mounted on the attaching devices of one of said parts, said disks or dials being located between the separate parts of the holder and protruding beyond said parts to permit of the manipulating thereof.

2. An educational device of the class described, comprising a holder composed of two approximately similar parts, ball and socket devices secured to the separate parts of the holder for detachably connecting the same, disks or dials rotatably mounted on the ball members of said devices and located between the separate parts of the holder, one part of the holder being provided with apertures and one of said disks or dials being provided with question data and the other with answer data which is adapted to register with the apertures in said part of the holder.

3. An educational device of the class described comprising a suitable holder, a pair of disks or dials rotatably mounted in connection with said holder, one of said disks or dials being provided with apertures adjacent to which are arranged parts of question data and the other disk or dial being provided at intervals with the other parts of said question data which are adapted to register with the apertures in said first named disk or dial.

4. An educational device of the class described comprising a suitable holder, a pair of disks or dials rotatably mounted in connection with said holder, one of said disks or dials being provided with apertures adjacent to which are arranged parts of question data and the other disk or dial being provided at intervals with the other parts of said question data which are adapted to register with the apertures in said first named disk or dial, and the holder being provided with an aperture in connection with which the data on said disk or dial is adapted to register.

5. An educational device of the class described comprising a suitable holder, a pair of disks or dials rotatably mounted in connection with said holder, one of said disks or dials being provided with apertures adjacent to which are arranged parts of question data and the other disk or dial being provided at intervals with the other parts of said question data which are adapted to register with the apertures in said first named disk or dial, the holder being provided with an aperture in connection with which the data on said disk or dial is adapted to register, and means on said first named disk or dial for designating the separate data thereon.

6. An educational device of the class described comprising a holder composed of two approximately similar parts, means for detachably connecting said parts, one of said parts being provided with two large apertures and two small apertures, a pair of disks or dials provided with question data adapted to register with one of said large apertures, and another disk or dial provided with answer data adapted to register with the other large aperture.

7. An educational device of the class described comprising a holder composed of two approximately similar parts, means for detachably connecting said parts, one of said parts being provided with two large apertures and two small apertures, a pair of disks or dials provided with question data adapted to register with one of said large apertures, another disk or dial provided with answer data adapted to register with the other large aperture, and one of said first named disks or dials and said last named disk or dial being provided with corresponding markings to designate the data thereon which markings are adapted to register with said small apertures.

8. An educational device of the class described comprising a holder composed of two approximately similar parts, means for detachably connecting said parts, one of said parts being provided with two large apertures and two small apertures, a pair of disks or dials provided with question data adapted to register with one of said large apertures, another disk or dial provided with answer data adapted to register with the other large aperture, one of said first named disks or dials and said last named disk or dial being provided with corresponding markings to designate the data thereon which markings are adapted to register with said small apertures, and the other part of the holder being apertured to permit of the manipulation of one of the disks or dials in said pair.

In testimony that I claim the foregoing as my invention I have signed my name in presence of the subscribing witnesses this 27th day of December 1919.

ISIDOR ZION.

Witnesses:
C. E. MULREANY,
H. E. THOMPSON.